(12) United States Patent
Ledbetter

(10) Patent No.: US 6,343,835 B1
(45) Date of Patent: Feb. 5, 2002

(54) COUCH CONSOLE

(76) Inventor: James L. Ledbetter, 2132 Robbin La., Jeffersonville, IN (US) 47130

( * ) Notice: Subject to any disclaimer, the term of this patent is extended or adjusted under 35 U.S.C. 154(b) by 0 days.

(21) Appl. No.: 09/388,064

(22) Filed: Aug. 31, 1999

Related U.S. Application Data

(60) Provisional application No. 60/098,399, filed on Aug. 31, 1998.

(51) Int. Cl.[7] .................................................. A47C 7/62
(52) U.S. Cl. ..................................... 297/188.2; 224/275
(58) Field of Search ........................ 297/188.01, 188.2, 297/135, 174; 312/235.8, 235.2, 278; 224/275

(56) References Cited

U.S. PATENT DOCUMENTS

| 2,524,909 A | | 10/1950 | Hines |
| 2,545,545 A | | 3/1951 | Drake |
| 3,104,131 A | | 9/1963 | Krone |
| 3,356,409 A | * | 12/1967 | Belsky et al. |
| 3,517,978 A | * | 6/1970 | Hudson |
| 4,022,502 A | | 5/1977 | Smith |
| 4,341,418 A | | 7/1982 | Chappell |
| 4,681,219 A | * | 7/1987 | Kitchens |
| 4,796,791 A | * | 1/1989 | Goss et al. |
| 5,302,000 A | | 4/1994 | Ayotte |
| 5,577,818 A | | 11/1996 | Sayre |

* cited by examiner

Primary Examiner—Milton Nelson, Jr.
(74) Attorney, Agent, or Firm—Carrithers Law Office; David W. Carrithers

(57) ABSTRACT

This device relates to a console for holding drinks, food articles, and accessories such as remote controls and the like and is removably held into position between a pair of cushions and is supported by a the frame of the furniture such as a couch, love seat, settee or the like. The console is formed having a body portion defining a step configuration having upper and lower storage or holding compartments and covers forming an arm rest, and having a base portion defining an upper longitudinal panel connecting a lower longitudinal panel by a longitudinal planar member intersecting the upper and lower longitudinal panels along the center portions thereof. The base of the console slides under and in between two cushions whereby the weight of the users hold the console in position thereinbetween.

20 Claims, 5 Drawing Sheets

COUCH CONSOLE

This application claims priority from U.S. Provisional application Ser. No. 60/098,399 filed on Aug. 31, 1998.

BACKGROUND OF THE INVENTION

1. Field of the Invention

This invention relates to furniture accessories such as consoles used in combination with a couch or other seating article.

2. Description of the Prior Art

SUMMARY OF THE INVENTION

The present invention is a console for use with couches and the like. The console is formed having a body portion defining a step configuration having upper and lower storage or holding compartments and covers forming an arm rest, and having a base portion defining an upper longitudinal panel connecting a lower longitudinal panel by a longitudinal planar member intersecting the upper and lower longitudinal panels along the center portions thereof. The base of the console slides under and in between two cushions whereby the weight of the users hold the console in position thereinbetween.

It is an object of the present invention to provide a means for holding articles of food, beverages, and accessories such as remote control units, TV guides, pencils and the like which is useable with conventional lounge furniture and is held in position by the weight of the user.

These and other objects of the present invention will be more fully understood from the following description of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
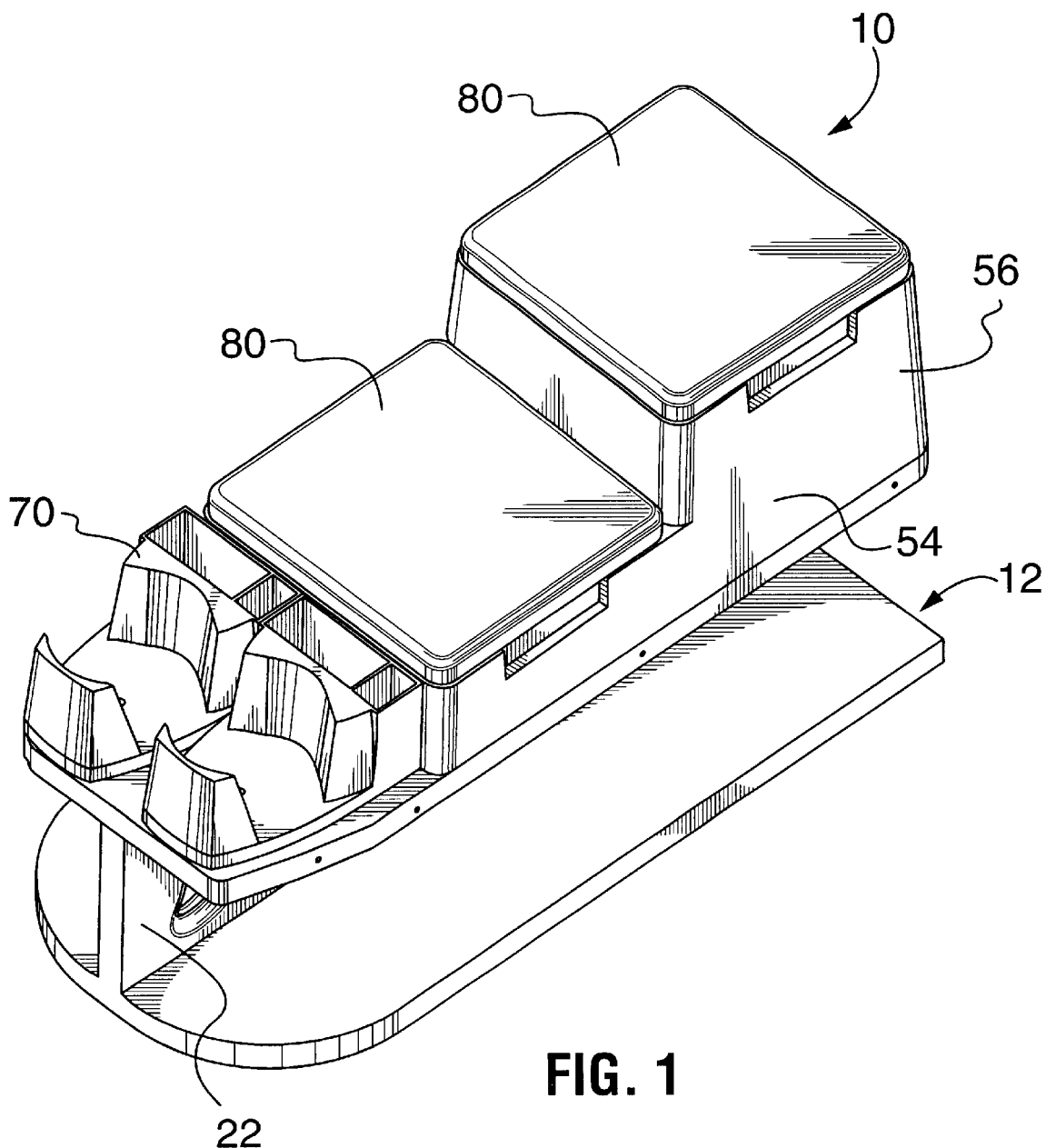
FIG. 1 is a perspective view showing the present invention.

The present invention 10 includes a base 12 defining an "I-beam" shaped support member including a generally rectangular shaped bottom panel 14 having a top surface 16 connecting to a bottom surface 18 of an opposing generally rectangular shaped upper panel 20 by a longitudinal vertical support panel member 22. More particularly, the bottom panel 14 has a straight rear end edge 24 connecting spaced apart parallel side edges 26 which converge together at the front end edge 28 forming a generally semi-circular curve. The top upper panel 20 includes a straight rear end edge 30 connecting spaced apart parallel side edges 32 which converge inwardly toward one another tapering slightly forming an angled edge 34 and are connected to a front end edge 36 which is shorter than the rear end edge 30. The vertical support panel member 22 is generally rectangular in shape and intersects and joins the upper panel member 20 and bottom panel member 14 alone the longitudinal axis. In one preferred embodiment an opening 38 is formed near the front end of the vertical support panel member 22 forming a hand hold.

The upper body 40 of the console defines a storage compartment secured to the top surface 42 of the upper panel 20 of the base 14. The storage compartment includes a floor panel 44 correspondingly shaped to fit shape of the upper panel 20. The floor panel 44 includes a straight rear end edge 46 connecting spaced apart parallel side edges 48 which converge inwardly toward one another tapering slightly forming a tapered edge 50 and are connected to a front end edge 52 which is shorter than the rear end edge 46. A storage unit including a front compartment 54 and a rear compartment 56 is mounted to the floor panel 44 separately or preferably in an integral unit. The floor panel 44 is attached to the top surface of the top panel 42 by means for holding including an adhesive, welding, fastening means such as screws or bolts, rivets, or may be formed having a tongue and groove arrangement, wherein the floor panel 44 slides over the top panel 42 of the base unit and is locked into position. The front compartment 54 includes a front wall 57, connecting to a pair of spaced apart sidewalls 58 all of a selected height forming a first compartment having a selected depth. Preferably the rear compartment 56 is formed integrally with the front compartment 54 by molding or other method of fabrication. The rear compartment 56 includes a rear wall 60 connecting a pair of spaced apart parallel sidewalls 62 of the same height extending upward from the floor panel 44, all of which are of greater height than the front wall 57 and sidewalls 58 of the front compartment 54 forming a step arrangement. The rear compartment 56 includes a front wall 64 which may extend to the floor panel 44 and serve as a rear wall for the front compartment 54 separating the front compartment 54 and rear compartment 56. The front wall 64 of the rear compartment may optionally be formed terminating at a point intersecting the top of the sidewalls 58 of the front compartment 54 so that the user may reach through the front compartment 54 to obtain objects stored in the rear compartment 56. A preferred embodiment utilizes just such an arrangement and includes an optional vertical plate or panel 66 which is removably retained inbetween the front and rear compartments, 54 and 56 respectively, and held by slots, grooves, or other means for holding such as a friction fit provided on the interior of the storage compartment between the front and rear compartments 54, and 56. The removable panel 66 serves as a front wall for the rear compartment 56 and rear well to the front compartment 54.

A container or a liner 68 may be inserted in either the front compartment 54 and/or rear compartment 56. As shown in the illustrations, a preferred rear compartment container 68 is of a square configuration providing a storage container. A square storage container 68 or other insert shaped for holding particular goods or for a particular purpose can be inserted in either of the compartments 54 or 56. For instance, one preferred embodiment includes the insertion of a cooler into the rear compartment 56. The cooler ray be formed of a plastic or metal box 68 by wrapping insulating material such as ROBITECH wrap, (a cellular material having an adhesive on one side), around the exterior surface of the cooler.

Figure 2:
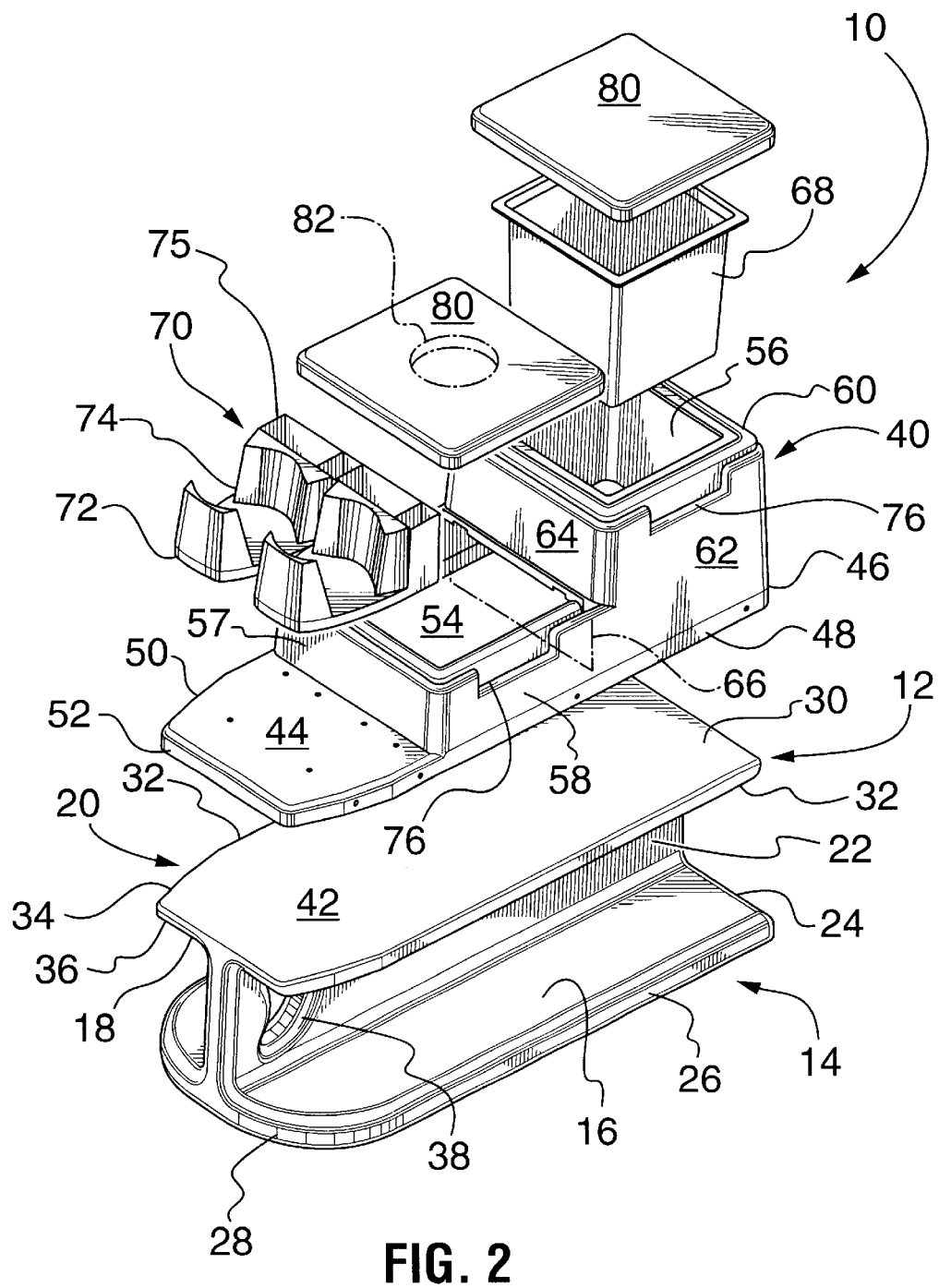
FIG. 2 is an exploded perspective view of the present invention.
Figure 3:
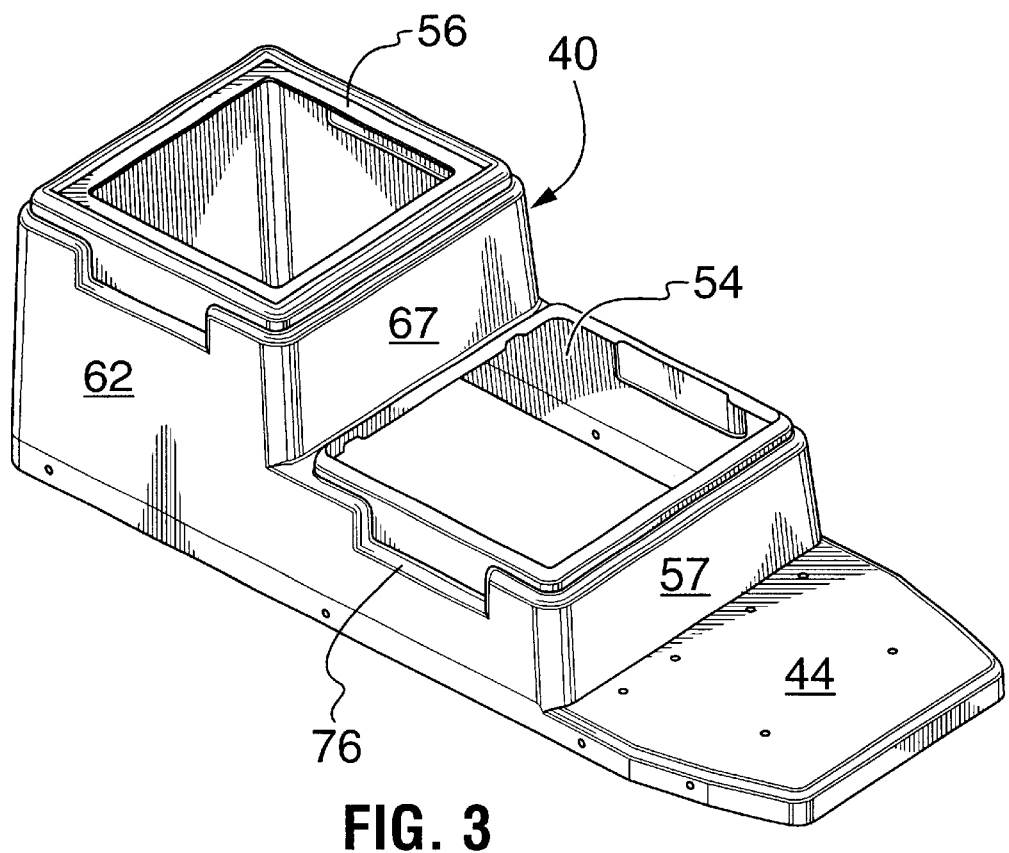
FIG. 3 is a perspective view of the body of the present invention.
Figure 4:
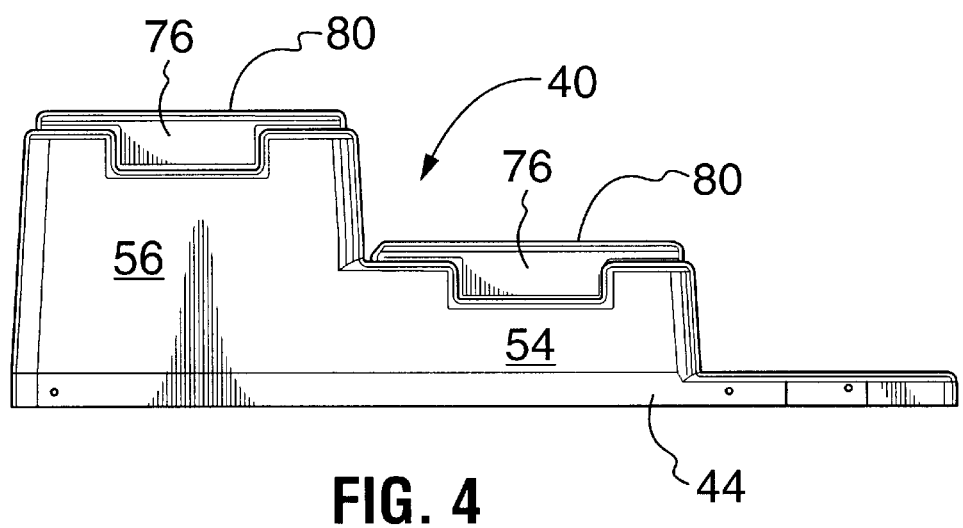
FIG. 4 is side view of FIG. 3.
Figure 5:
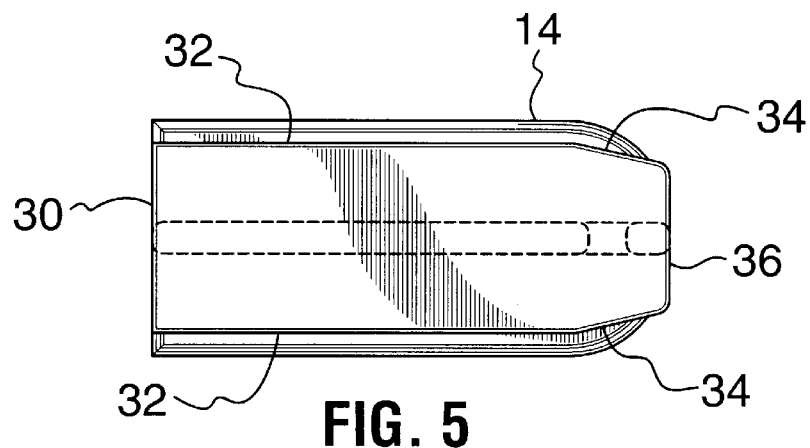
FIG. 5 is a top view of the base of the present invention.
Figure 6:
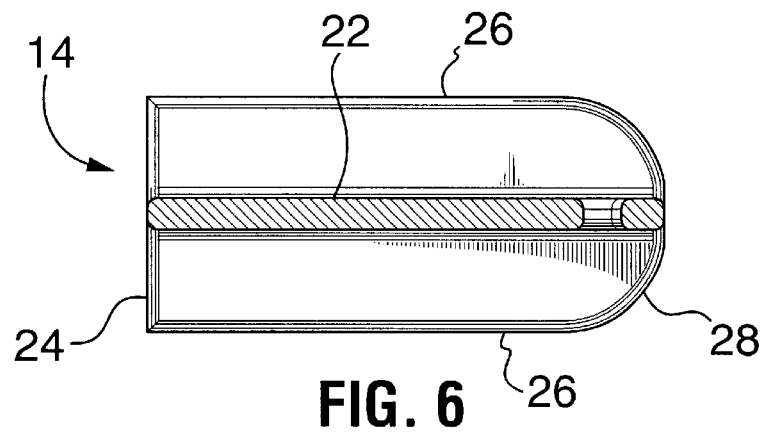
FIG. 6 is a bottom view of the base of FIG. 5.
Figure 7:
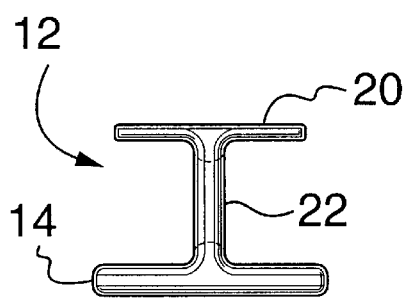
FIG. 7 is a front end view of the base of FIG. 5.
Figure 8:
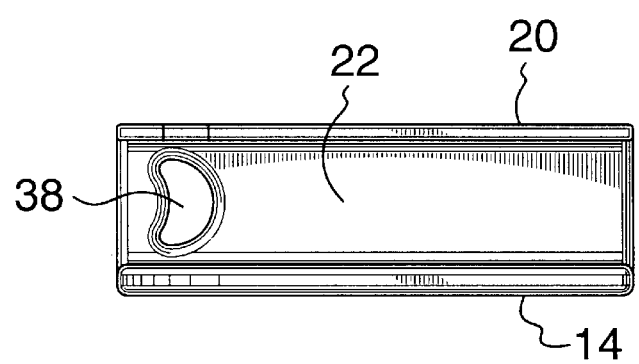
FIG. 8 is a side view of the base of FIG. 5.

One preferred insert for the front compartment is a cup holder 70. As shown, the selected cup holder 70 holds two cups spaced apart from one another in a module having a flat bottom surface 72 and cylindrical depressions 74 or cavities formed within a body having front and back curved sidewall holding surfaces for cooperative engagement with a cup, bottle, or can. The cup holders 70 as shown, include a bracket member 75 integrally molded as part of the body webbing for structural support. It is anticipated any type of cup holder 70 commercially available may be inserted into the front compartment 54. The cup holders 70 of the preferred embodiment are secured to the floor panel 44 in front of the front compartment as shown best in FIG. 2, by fastening means such as screws, rivets, adhesives, or the like; however, the cup holders 70 may be removably inserted into a compartment and held by an adhesive or even by a frictional fit.

As best illustrated in FIG. 1, the front and/or rear compartments 54, 56 include cut-away sections 76 providing easy access for insertion or removal of the inserts and access to the edge of the lid 80 for removing same.

Moreover, as noted, the preferred embodiment includes covers or lids 80 cooperatively engaging either the front compartment 54 and/or rear compartment 56. The lids 80 may be snapped on and held by a frictional fit, attached by a living hinge, or hingedly connected by means for pivoting and holding such as a wire loop or plastic strap arrangement. The lids 80 may also be covered with a cushioning material such as pad covered with vinyl, leather, or cloth.

Moreover, one or more of the lids 80 may be formed having apertures 82 therein for disposing cups therein to hold then in position.

The lids 80 may also accommodate or be replaced with a removal tray, (not shown) for holding food items thereon and may be formed with flanges for holding to the sides of the lids 80 or formed having a bottom surface corresponding to the surface of the lid top for cooperative engagement therewith.

It is also contemplated that brackets (not shown) may be attached to one or more of the sides to held remote controls, video tapes, C.D.'s and the like by hook and loop fasteners, rivets, screws, or adhesives.

Figure 9:
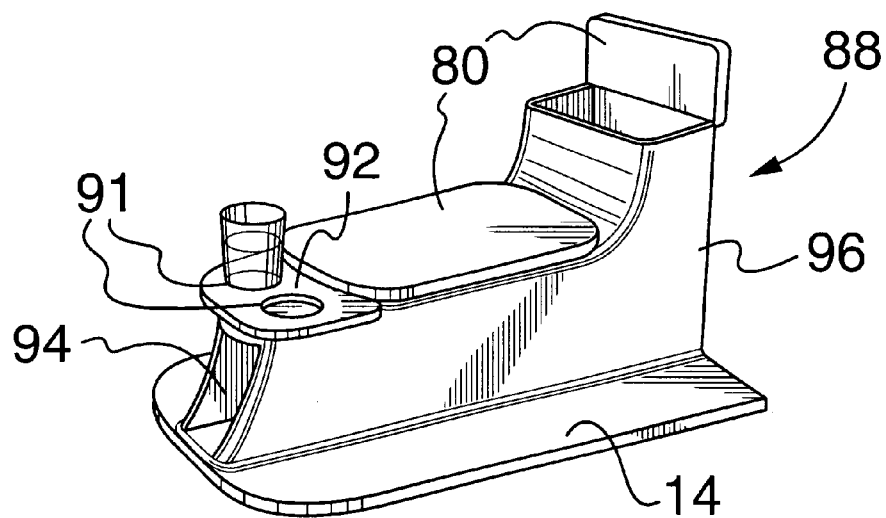
FIG. 9 is a perspective side view of an alternate embodiment of the present invention.
Figure 10:
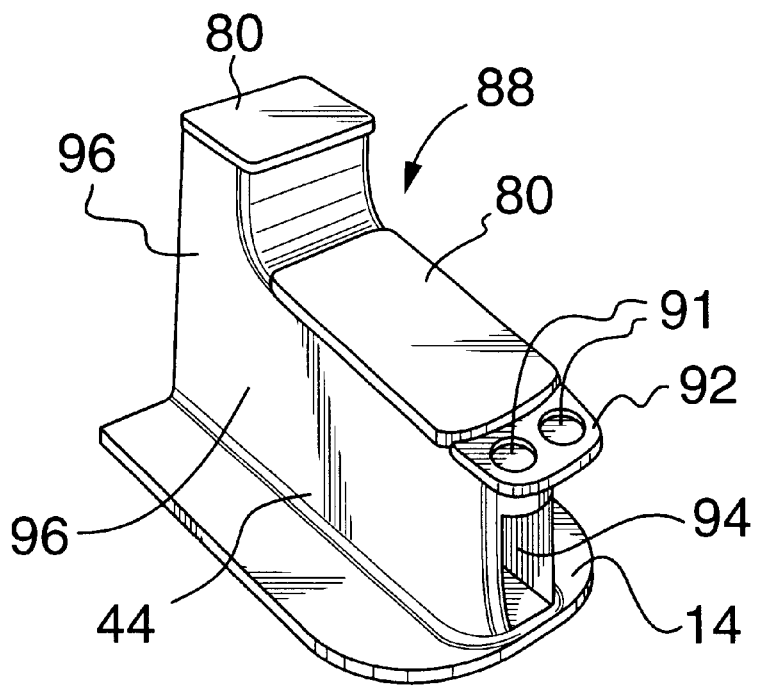
FIG. 10 is perspective front view of the embodiment shown in FIG. 9.

An alternate embodiment 88 of the present invention is shown in FIGS. 9 and 10. The alternate embodiment utilizes a single base panel 14 attached to the bottom of the floor panel of the console body 96. The cup holders 91 define a pair of apertures extending through a flat support member 92 extending outwardly from the top of the front compartment and a storage cavity 94 is formed below the cup holders.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

Accordingly, this invention is not intended to be limited by the specific exemplifications presented hereinabove. Rather, what is intended to be covered is within the spirit and scope of the appended claims.

I claim:

1. A console, comprising:
   an upper body portion including a front compartment and a rear compartment, and a floor panel supporting said front compartment and said rear compartment;
   a base comprising an upper longitudinal panel oriented horizontally and connecting to a lower longitudinal panel oriented horizontally spaced apart therefrom and in alignment therewith by a longitudinal planar member oriented vertically intersecting said upper longitudinal panel and said lower longitudinal panel along a center portion of each; and
   wherein said base of said console is slidably held under and in between two cushions of a seat holding said console in position thereinbetween.

2. The console of claim 1, said rear compartment including an insert.

3. The console of claim 2, wherein said insert is a cooler container having means for insulating wrapped therearound.

4. The console of claim 1, said front compartment including an insert.

5. The console of claim 4, said insert comprising a cup holder.

6. The console of claim 1, said rear compartment including a rear lid and said front compartment including a front lid.

7. The console of claim 6, wherein said rear lid and said front lid are removable.

8. The console of claim 6, wherein said rear lid is hingedly connecting to said rear compartment.

9. The console of claim 6, said front lid including openings correspondingly sized and shaped for holding cups.

10. The console of claim 1, said longitudinal planar member including an opening near the front end thereof defining a hand hold.

11. The console of claim 1, said upper longitudinal panel and said floor panel each one including a straight rear end edge connecting spaced apart parallel side edges, said side edges including a front portion converging toward one another connecting to a front end edge.

12. The console of claim 1, said lower longitudinal panel having a curved front edge.

13. The console of claim 1, said upper body portion including a cup holder attaching to said floor panel in front of said front compartment.

14. The console of claim 13, wherein said cup holder is removably retained to said floor panel.

15. The console of claim 1, including a divider panel extending inbetween said front compartment and said rear compartment.

16. The console of claim 1, said rear compartment including a padded cover.

17. The console of claim 1, said front compartment including a padded cover.

18. A console, comprising:
   an upper body portion including at least one compartment having a cover thereon and a floor panel supporting said at least one compartment;

a longitudinal base panel connecting to said upper body portion, said longitudinal base panel having a greater width than said upper body portion centered thereon forming longitudinal flanges projecting outwardly along the upper body portion along the length thereof; and wherein said longitudinal base panel of said console is slidably held in under a pair of cushions of a seat, and said upper body portion is slidably held in between two cushions of a seat holding said console in position thereinbetween.

19. The console of claim 18, including a cup holder extending from a front wall of said at least one compartment of said upper body portion.

20. The console of claim 19, including a storage cavity formed within said at least one compartment of said upper body portion below said cup holder.

* * * * *